(12) United States Patent
Amit et al.

(10) Patent No.: US 8,510,842 B2
(45) Date of Patent: *Aug. 13, 2013

(54) PINPOINTING SECURITY VULNERABILITIES IN COMPUTER SOFTWARE APPLICATIONS

(75) Inventors: Yair Amit, Herzliya (IL); Roee Hay, Herzliya (IL); Roi Saltzman, Herzliya (IL); Adi Sharabani, Herzliya (IL)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/085,902

(22) Filed: Apr. 13, 2011

(65) Prior Publication Data

US 2012/0266246 A1 Oct. 18, 2012

(51) Int. Cl.
*G06F 12/14* (2006.01)
*G06F 11/30* (2006.01)
*G06F 9/44* (2006.01)

(52) U.S. Cl.
USPC ............. 726/25; 713/187; 713/188; 713/189; 717/124; 717/126; 717/127; 717/129

(58) Field of Classification Search
USPC ................... 726/25; 713/187–189; 717/124, 717/126, 127, 129
See application file for complete search history.

(56) References Cited

U.S. PATENT DOCUMENTS

2006/0137016 A1* 6/2006 Margalit et al. ................. 726/26
2008/0209558 A1* 8/2008 Zunke et al. .................... 726/23
2009/0282304 A1* 11/2009 Piry et al. ....................... 714/718
2010/0088745 A1* 4/2010 Song et al. ........................ 726/2

OTHER PUBLICATIONS

Thorton, Roger: "In Search of the Holy Grail", A Talk for OWASP BeNeLux, Fortify 2008.

* cited by examiner

*Primary Examiner* — Aravind Moorthy
(74) *Attorney, Agent, or Firm* — Patents on Demand P.A.; Brian K. Buchheit; Scott M. Garrett

(57) ABSTRACT

A build process management system can acquire data pertaining to a software build process that is currently being executed by an automated software build system. The software build process can include executable process steps, metadata, and/or environmental parameter values. An executable process step can utilize a build artifact, representing an electronic document that supports the software build process. The acquired data can then be synthesized into an immutable baseline build process and associated baseline artifact library. The baseline artifact library can store copies of the build artifacts. The immutable baseline build process can include baseline objects that represent data values and dependencies indicated in the software build process. In response to a user-specified command, an operation can be performed upon the baseline build process and associated baseline artifact library.

12 Claims, 5 Drawing Sheets

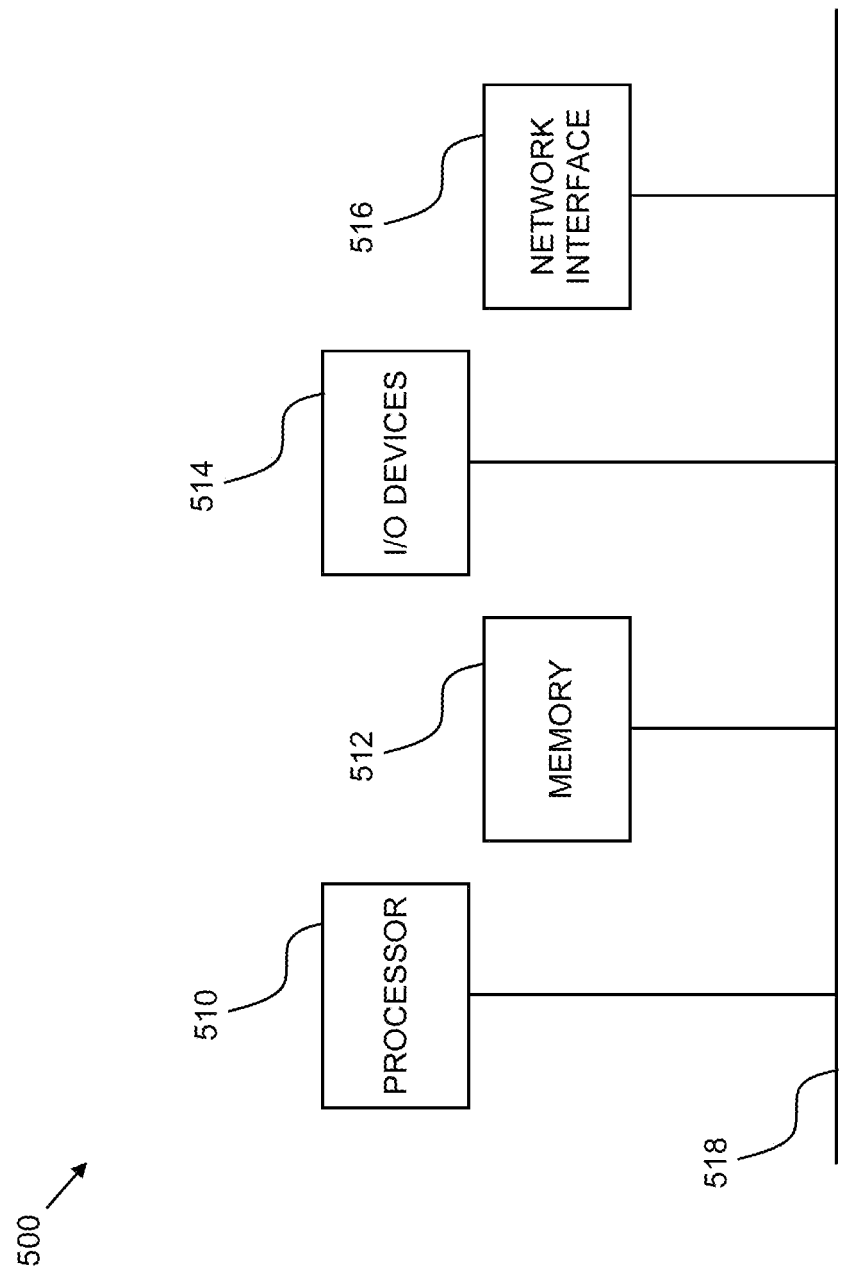

US 8,510,842 B2

PINPOINTING SECURITY VULNERABILITIES IN COMPUTER SOFTWARE APPLICATIONS

BACKGROUND

The present invention relates to computer software analysis and testing in general.

Computer software applications are often analyzed to determine whether they are vulnerable to malicious attacks or otherwise show signs of security vulnerabilities. One such type of analysis known as "white-box" testing involves statically analyzing the instructions of a computer software application without executing the application. Another type of analysis known as "black-box" testing involves executing a computer software application and attacking the application using known forms of malicious attacks. Yet another type of analysis combines black-box testing with monitoring the execution of a computer software application that has been specially instrumented to detect black-box attacks. Despite the use of such analyses, application developers spend a great deal of time manually poring over application instructions in order to make sense of the results of such analyses to identify actual security vulnerabilities.

BRIEF SUMMARY

In one aspect of the invention a method is provided for pinpointing security vulnerabilities in computer software applications, the method including setting a debugging breakpoint within a computer software application proximate to an instruction that is correlated with an attack, performing the attack on the computer software application during execution of the computer software application in a debugging mode, halting the execution of the computer software application in the debugging mode when the attack triggers the debugging breakpoint, and displaying the instruction on a computer display within the context of an interactive debugging session.

In another aspect of the invention a method is provided for pinpointing security vulnerabilities in computer software applications, the method including performing an attack on a computer software application during execution of the computer software application, where the attack is designed to test for a security vulnerability, correlating the attack with an instruction within the computer software application, setting a debugging breakpoint within the computer software application proximate to the instruction, performing the attack on the computer software application during execution of the computer software application in a debugging mode, halting the execution of the computer software application in the debugging mode when the attack triggers the debugging breakpoint, displaying the instruction and a description of the attack on a computer display within the context of an interactive debugging session, and making at least one execution environment value of the computer software application available for inspection.

Systems and a computer program product embodying the invention are also provided.

BRIEF DESCRIPTION OF THE SEVERAL VIEWS OF THE DRAWINGS

FIG. 5 is a simplified block diagram illustration of an exemplary hardware implementation of a computing system, constructed and operative in accordance with an embodiment of the invention.

DETAILED DESCRIPTION

Figure 1:
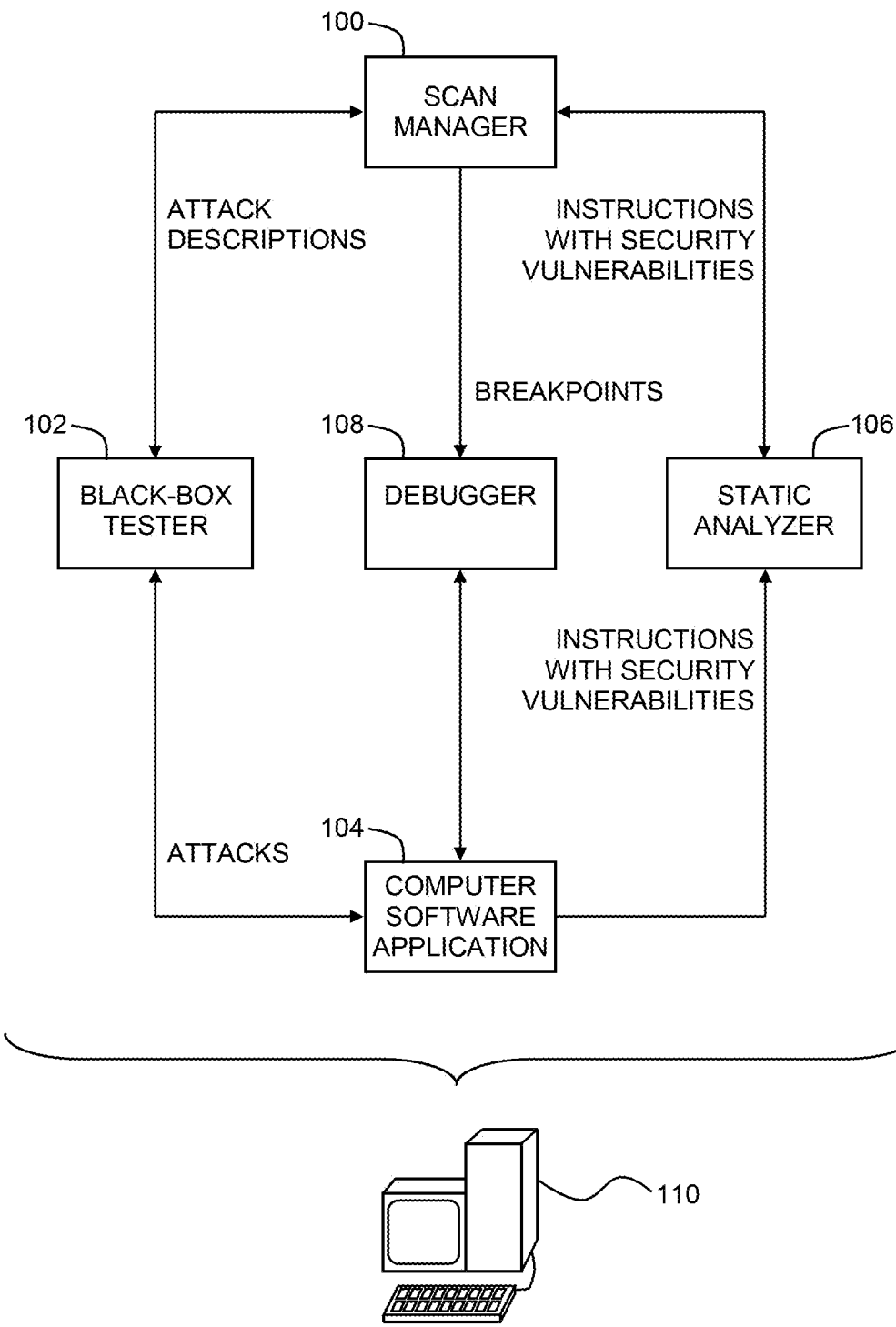
FIG. 1 is a simplified conceptual illustration of a system for pinpointing security vulnerabilities in computer software applications, constructed and operative in accordance with an embodiment of the invention.

The disclosure is now described within the context of one or more embodiments, although the description is intended to be illustrative of embodiments of the invention as a whole, and is not to be construed as limiting other embodiments of the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for pinpointing security vulnerabilities in computer software applications, constructed and operative in accordance with an embodiment of the invention. In the system of FIG. 1, a scan manager 100 is configured to receive output from, and preferably control, a black-box tester 102, such as IBM Rational AppScan™, commercially-available from International Business Machines Corporation, Armonk, N.Y. Black-box tester 102 is configured to attack a computer software application 104 using conventional black-box testing techniques, such as using attacks designed to test for security vulnerabilities, where computer software application 104 is any computer-based application that may be the subject of conventional black-box testing techniques. Scan manager 100 is also configured to receive output from, and preferably control, a static analyzer 106, such as IBM Rational AppScan Source Edition™, commercially-available from International Business Machines Corporation. Static analyzer 106 is configured in accordance with conventional techniques to statically analyze the instructions of computer software application 104, such as where the instructions are in the form of source code or byte code, to identify instructions that potentially represent security vulnerabilities, and report those instructions identified as security vulnerabilities to scan manager 100.

Scan manager 100 is preferably configured using conventional techniques to correlate attacks performed by black-box tester 102 on computer software application 104, with instructions within computer software application 104 that are reported by static analyzer 106 as potentially representing security vulnerabilities, or otherwise to receive such correlation information. An instruction is typically correlated with a particular type of attack if it is determined that the instruction suffers from a security vulnerability that makes it susceptible to the attack. For any given instruction within computer software application 104 that has been correlated with an attack by black-box tester 102, scan manager 100 is preferably configured to set a debugging breakpoint within computer software application 104 proximate to the instruction, such as by controlling a debugger 108 to do so, where debugger 108 is any known computer software application debugger, such as such as Microsoft Visual Studio™ Debugger, commercially-available from Microsoft Corporation, Redmond, Wash.

For any given debugging breakpoint that has been set within computer software application 104 as described hereinabove for a given attack performed by black-box tester 102 on computer software application 104, and that has been correlated with an instruction within computer software application 104, scan manager 100 is preferably configured to cause black-box tester 102 to perform the same attack on computer software application 104 during execution of computer software application 104 in a debugging mode, such as when the execution of computer software application 104 is controlled by and/or monitored by debugger 108. As the attack is correlated with an instruction within computer software application 104 for which a breakpoint has been set, debugger 108 preferably halts the execution of computer software application 104 when the breakpoint is triggered by the attack and initiates an interactive debugging session. During the interactive debugging session debugger 108 preferably displays, such as on a display device of a computer 110, the instruction for which the breakpoint has been set, such as in the context of a listing of other neighboring instructions of computer software application 104, and makes one or more execution environment values of computer software application 104 available for inspection, such as variables and stack information. Debugger 108 also preferably displays a description of the attack, such as may be provided by black-box tester 102. For example, debugger 108 may display a specific HTTP request that triggered the breakpoint.

Any of the elements shown in FIG. 1 are preferably executed by or otherwise made accessible to computer 110, such as by implementing any of the elements in computer hardware and/or in computer software embodied in a physically-tangible, computer-readable medium in accordance with conventional techniques.

Figure 2:
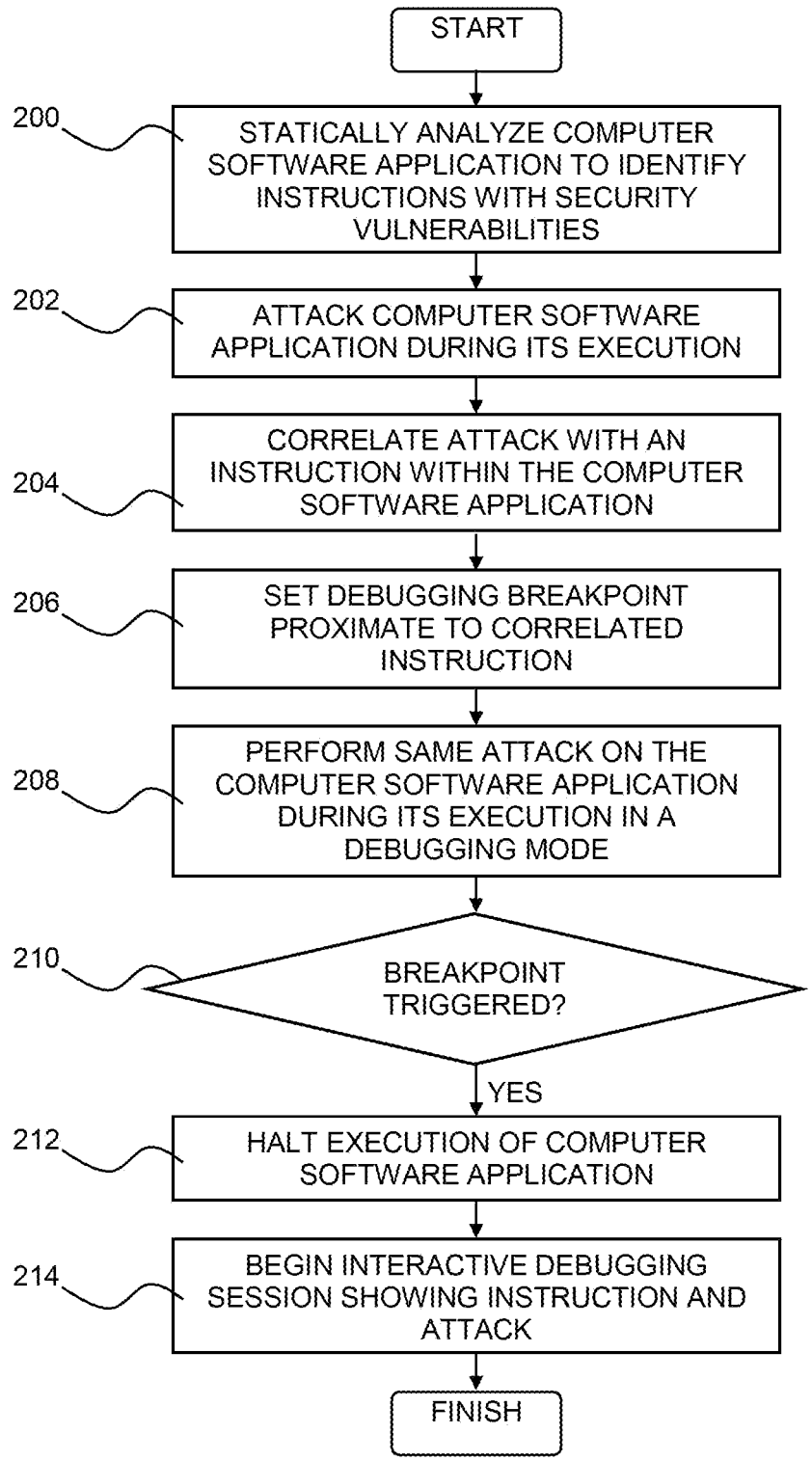
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, the instructions of a computer software application are statically analyzed to identify instructions that potentially represent security vulnerabilities (step 200). One or more attacks are performed on the computer software application during its execution, such as where the attacks are designed to aid in identifying security vulnerabilities within the computer software application (step 202). A given attack is correlated with an instruction within the computer software application (step 204). A debugging breakpoint is set within the software application proximate to the instruction that is correlated with the attack (step 206). The same attack is performed on the computer software application during its execution in a debugging mode (step 208). If the breakpoint is triggered (step 210), execution of the computer software application is halted (step 212), and an interactive debugging session is begun (step 214) where the instruction is displayed, preferably in the context of neighboring instructions, preferably where one or more execution environment values of the computer software application are made available for inspection, and preferably where a description of the attack is also displayed.

Figure 3:
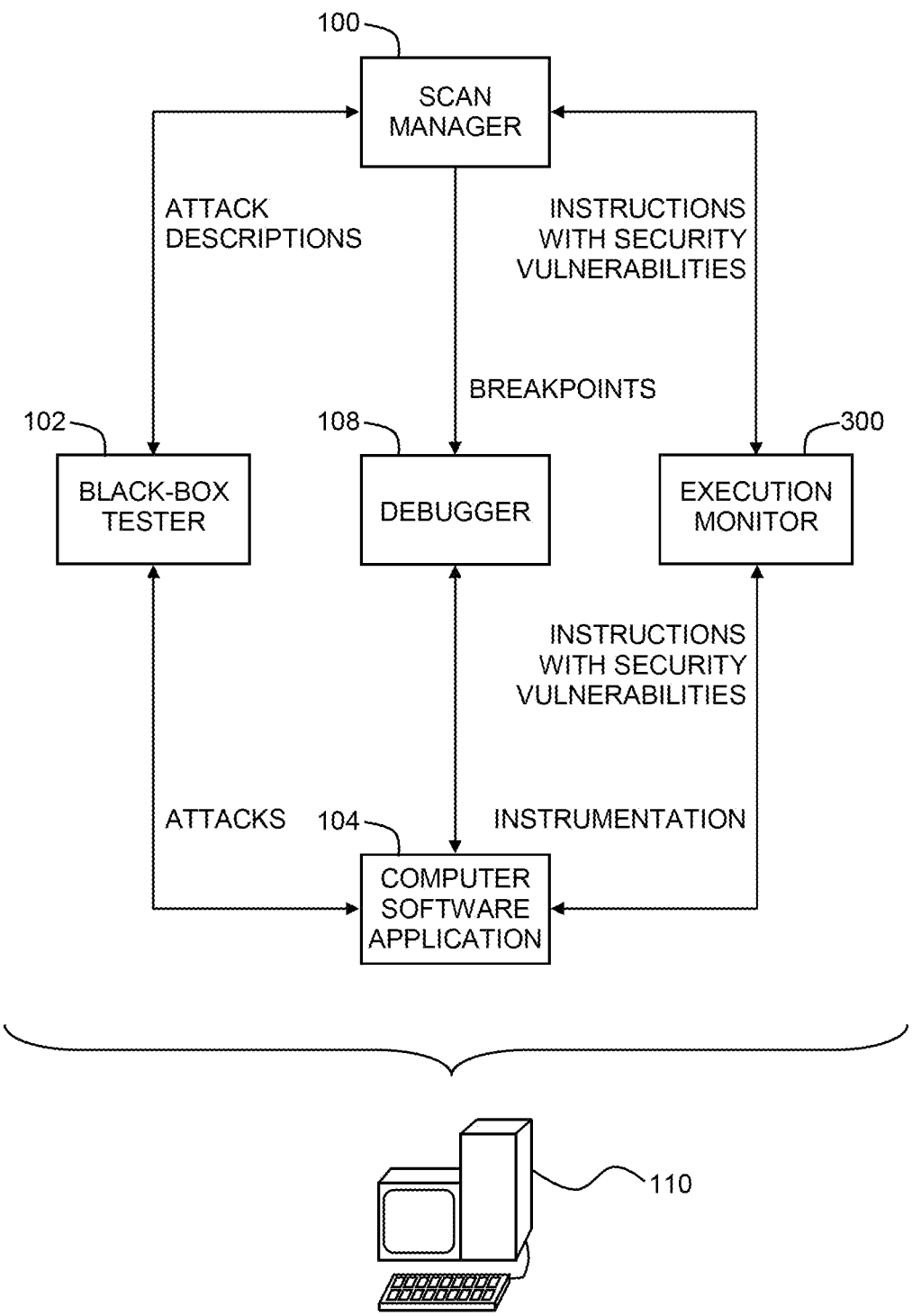
FIG. 3 is a simplified conceptual illustration of a system for pinpointing security vulnerabilities in computer software applications, constructed and operative in accordance with an alternative embodiment of the invention.

Reference is now made to FIG. 3 which is a simplified conceptual illustration of a system for pinpointing security vulnerabilities in computer software applications, constructed and operative in accordance with an alternative embodiment of the invention. The system of FIG. 3 is substantially similar to the system of FIG. 1, with the notable exception that in place of static analyzer 106, an execution monitor 300 is shown, such as Acunetix Web Vulnerability Scanner™, commercially-available from Acunetix Ltd., Portomaso, Malta. Execution monitor 300 preferably instruments computer software application 104 in accordance with conventional techniques, and monitors computer software application 104 during its execution so as to detect where attacks by black-box tester 102 occur within computer software application 104, and thereby identify which instructions within computer software application 104 represent security vulnerabilities. Execution monitor 300 preferably reports those instructions identified as security vulnerabilities to scan manager 100. As before, an instruction is typically correlated with a particular type of attack if it is determined that the instruction suffers from a security vulnerability that makes it susceptible to the attack.

Figure 4:
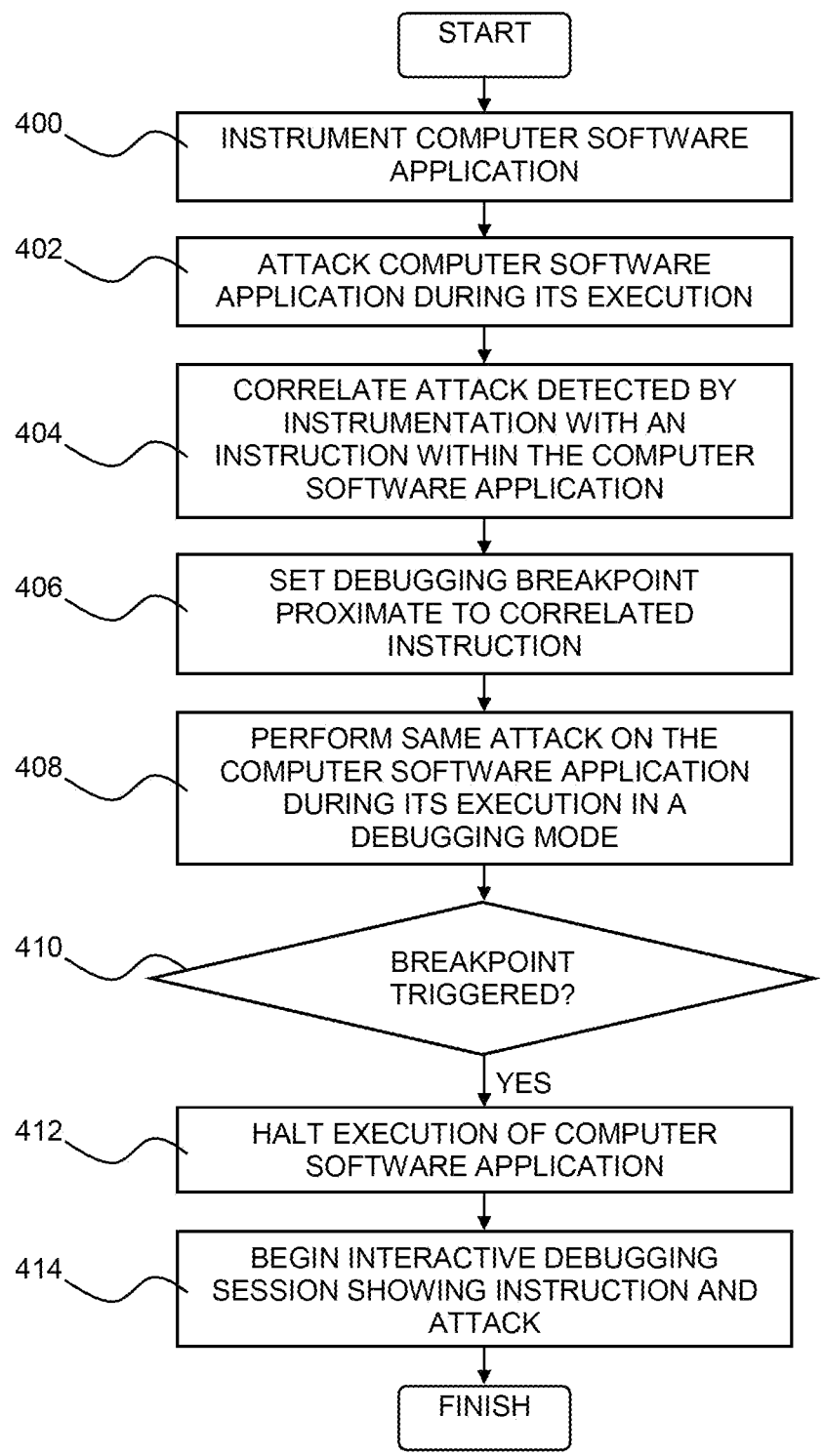
FIG. 4 is a simplified flowchart illustration of an exemplary method of operation of the system of FIG. 3, operative in accordance with an embodiment of the invention.

Reference is now made to FIG. 4 which is a simplified flowchart illustration of an exemplary method of operation of the system of FIG. 3, operative in accordance with an embodiment of the invention. In the method of FIG. 4, a computer software application is instrumented to detect attacks performed on the application during its execution (step 400). One or more attacks are performed on the instrumented computer software application during its execution, such as where the attacks are designed to aid in identifying security vulnerabilities within the computer software application (step 402). When an attack is detected by the instrumentation, the attack is correlated with an instruction within the computer software application (step 404). A debugging breakpoint is set within the software application proximate to the instruction that is correlated with the attack (step 406). The same attack is performed on the computer software application during its execution in a debugging mode (step 408). If the breakpoint is triggered (step 410), execution of the computer software application is halted (step 412), and an interactive debugging session is begun (step 414) where the instruction is displayed, preferably in the context of neighboring instructions, preferably where one or more execution environment values of the computer software application are made available for inspection, and preferably where a description of the attack is also displayed.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system comprising:
   one or more processors;
   one or more storage mediums storing program instructions executable by the one or more processors;
   a scan manager, comprising at least a portion of the program instructions, configured to set a debugging breakpoint within a computer software application proximate to an instruction that is correlated with an attack;
   a black-box tester, comprising at least a portion of the program instructions, configured to perform the attack on the computer software application during execution of the computer software application in a debugging mode; and
   a debugger, comprising at least a portion of the program instructions, configured to
     halt the execution of the computer software application in the debugging mode when the attack triggers the debugging breakpoint, and
     display the instruction on a computer display within the context of an interactive debugging session.

2. The system according to claim 1, wherein the scan manager is configured to correlate the instruction with the attack.

3. The system according to claim 2 and further comprising a static analyzer configured to statically analyze the computer software application to identify the instruction as potentially representing a security vulnerability prior to the scan manager correlating the instruction with the attack.)

4. The system according to claim 2 wherein the black-box tester is configured to perform the attack during execution of the computer software application the scan manager correlating the instruction with the attack.

5. The system according to claim 4 wherein the black-box tester is configured to perform the attack wherein the attack is designed to test for a security vulnerability.

6. The system according to claim 4 and further comprising an execution monitor configured to:
   instrument the computer software application,
   monitor the computer software application during its execution in the debugging mode, and
   detect where the attack occurs within the computer software application, thereby identifying the instruction.

7. The system according to claim 1 wherein the debugger is configured to:
   display a description of the attack,
   display the instruction in the context of a listing of a plurality of instructions of the computer software application, and
   make at least one execution environment value of the computer software application available for inspection.

8. A system for pinpointing security vulnerabilities in computer software applications, the system comprising:
   one or more processors;
   one or more storage mediums storing program instructions executable by the one or more processors;
   a black-box tester, comprising at least a portion of the program instructions, configured to
     perform an attack on a computer software application during execution of the computer software application, wherein the attack is designed to test for a security vulnerability, and
     perform the attack again on the computer software application during execution of the computer software application in a debugging mode;
   a scan manager configured to
     correlate the attack with an instruction within the computer software application, and
     set a debugging breakpoint within the computer software application proximate to the instruction; and
   a debugger configured to
     halt the execution of the computer software application in the debugging mode when the attack triggers the debugging breakpoint,
     display the instruction and a description of the attack on a computer
     display within the context of an interactive debugging session, and
     make at least one execution environment value of the computer software application available for inspection.

9. The system according to claim 8 and further comprising a static analyzer configured to statically analyze the computer software application to identify the instruction as potentially representing a security vulnerability prior to the scan manager correlating the instruction with the attack.

10. The system according to claim 8 and further comprising an execution monitor configured to
    instrument the computer software application,
    monitor the computer software application during its execution in the debugging mode, and
    detect where the attack occurs within the computer software application, thereby identifying the instruction.

11. The system according to claim 8 wherein the debugger is configured to:
    display a description of the attack; and
    display the instruction in the context of a listing of a plurality of instructions of the computer software application.

12. The system according to claim 8, wherein the system further comprises:
    at least one processor; and
    at least one computer-readable storage medium, wherein the black box tester, the scan manager, and the debugger each comprise computer program instructions stored in the at least one storage medium, wherein the computer program instructions are executed by at least one processor when the system is running.

* * * * *